(12) United States Patent
Kim et al.

(10) Patent No.: US 7,589,442 B2
(45) Date of Patent: Sep. 15, 2009

(54) MOTOR AND WASHING MACHINE WITH THE SAME MOUNTED THEREIN

(75) Inventors: Dong Won Kim, Kyunggi-do (KR); Hee Tae Lim, Kyunggi-do (KR); Sang Wook Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 10/752,548

(22) Filed: Jan. 8, 2004

(65) Prior Publication Data

US 2004/0163423 A1    Aug. 26, 2004

(30) Foreign Application Priority Data

Feb. 20, 2003    (KR)    .................. 10-2003-0010773

(51) Int. Cl.
*H02K 9/06* (2006.01)
*H02K 21/22* (2006.01)

(52) U.S. Cl. .................. 310/61; 310/59; 310/60 R

(58) Field of Classification Search ............. 310/61–63, 310/59

See application file for complete search history.

(56) References Cited

U.S. PATENT DOCUMENTS

| | | | | |
|---|---|---|---|---|
| 4,101,945 A | * | 7/1978 | Butsch .................. | 360/99.04 |
| 5,892,307 A | * | 4/1999 | Pavlovich et al. ........ | 310/68 B |
| 5,909,339 A | | 6/1999 | Hong | |
| 6,396,177 B1 | * | 5/2002 | Shin et al. .................. | 310/63 |
| 6,744,157 B2 | * | 6/2004 | Choi et al. .................. | 310/62 |
| 6,781,263 B2 | * | 8/2004 | Uemura .................. | 310/74 |
| 6,798,098 B1 | * | 9/2004 | Tai .................. | 310/67 R |
| 7,078,841 B2 | * | 7/2006 | Yokota .................. | 310/153 |

FOREIGN PATENT DOCUMENTS

| | | |
|---|---|---|
| EP | 0 887 908 A1 | 12/1998 |
| EP | 1 018 795 A1 | 7/2000 |
| JP | 61-258643 | 11/1986 |
| JP | 04-38149 * | 2/1992 |
| JP | 5-344680 A | 12/1993 |

(Continued)

OTHER PUBLICATIONS

JPO Website, partial machine translation of Kurihara, JP 10-210727 Aug. 1998.*

*Primary Examiner*—Burton Mullins
(74) *Attorney, Agent, or Firm*—Birch, Stewart, Kolasch & Birch, LLP

(57) ABSTRACT

Disclosed herein is a motor and a washing machine with the same mounted therein. The motor includes a rotor cup having cooling-holes and lower blades formed at the bottom part thereof. The cooling-holes and lower blades are arranged such that each of the cooling-holes and lower blades is at a prescribed angle to the radial direction of the rotor cup so that the volume of blown air is increased, and thus a blowing force is also increased. The rotor cup is provided at the lower part of the circumference thereof with vents for allowing the air introduced into the inside of the rotor cup to be discharged to the outside therethrough. The rotor is provided at the upper side thereof with backward type upper blades so that the upper part of the motor is separately cooled, whereby cooling efficiency of the motor is improved.

10 Claims, 16 Drawing Sheets

FOREIGN PATENT DOCUMENTS

| | | | |
|---|---|---|---|
| JP | 8-191555 A | | 7/1996 |
| JP | 08191554 A | * | 7/1996 |
| JP | 08191555 A | * | 7/1996 |
| JP | 10-210727 | * | 8/1998 |
| JP | 2001-16835 A | | 1/2001 |

* cited by examiner (Backward type) (Forward type) (Radial type)

(Backward type)

(Forward type)

(Radial type)

(Backward type)

(Forward type)

(Radial type)

(Backward type)

(Forward type)

(Radial type)

Position
(Backward type)

Position
(Forward type)

Position
(Radial type)

MOTOR AND WASHING MACHINE WITH THE SAME MOUNTED THEREIN

This Nonprovisional application claims priority under 35 U.S.C. § 119(a) on Patent Application No(s). 10-2003-0010773 filed in KOREA on Feb. 20, 2003, the entire contents of which are hereby incorporated by reference.

BACKGROUND OF THE INVENTION

1. Field of the Invention

The present invention relates to a motor and a washing machine with the same mounted therein, and more particularly to a motor including a stator having air flow channels formed at the upper and lower parts thereof, whereby the stator is effectively cooled, and a washing machine with the same mounted therein.

2. Description of the Related Art

As shown in FIGS. 1 and 2, the conventional motor comprises: a stator 10; a rotor 20 rotatably disposed around the stator 10 while the rotor 20 is spaced apart from the stator 10 by a prescribed distance of air gap G; and a rotor cup 30, to which the rotor 20 is fixed at the inner circumference thereof in such a manner that the rotor cup 30 is rotated along with the rotor 20.

The stator 10 comprises: a ring-shaped core 12; a plurality of teeth 16 evenly attached to the outer circumference of the ring-shaped core 12 in the circumferential direction while a prescribed slot 14 is formed between one of the teeth 16 and the neighboring tooth; and coils 18 wound on the teeth 16, respectively, the coils 18 being connected to an external source of electricity.

The rotor 20 is made of a ring-shaped magnet with north poles and south poles alternately arranged. When electric current is supplied to the coils, the rotor 20 interacts electromagnetically with the stator 10 so that the rotor 20 is rotated.

At the inner bottom surface of the rotor cup 30 are formed a plurality of rectangular cooling-holes 32, which are drilled in the radial direction. At one side of each of the cooling-holes 32 is provided a rectangular blade 34. When the rotor cup 30 is rotated along with the rotor 20, external cool air is introduced into the rotor cup 30 through the cooling-holes 32 by means of a blowing force from the blades 34. The cool air introduced into the rotor cup 30 passes through the air gap G and the slots 14, and is then discharged to the outside through the opened upper part of the rotor cup 30 so that the stator 10 and the rotor 20 are cooled.

In the case that the above-mentioned motor is mounted in a washing machine having a housing 54 fixed to the bottom part of an outer tub 52 mounted in a case 50, as shown in FIG. 3, the stator 10 is provided at the inner circumference thereof with a boss 10b. The boss 10b has a second fixing-hole 10a, which vertically communicates with a first fixing-hole 54a formed at the bottom part of the housing 54. Bolts 56 are inserted through the first fixing-holes 54a and the second fixing-holes 10a, and are then securely engaged in nuts 57 at the ends of the bolts 56 as shown in FIG. 3, so that the stator 10 is securely fixed to the housing 54 of the washing machine.

Through the center of the bottom part of the rotor cup 30 is fixedly inserted the lower end of a rotating shaft 58. The upper end of the rotating shaft 58 is inserted through the housing 54 and the outer tub 52 of the washing machine in such a manner that the rotating shaft 58 is rotatably mounted in the outer tub 52. The upper end of the rotating shaft 58 is fixed to an inner tub 60 of the washing machine where the laundry is put in such a manner that the rotating shaft 58 is rotated along with the inner tub 60 of the washing machine. Consequently, the rotor cup 30 is rotated along with the inner tub 60 of the washing machine by means of the rotating shaft 58.

When an electromagnetic force is generated between the stator 10 and the rotor 20 as electric current is supplied to the coils 18, the rotor 20, the rotor cap 30, the rotating shaft 58, and the inner tub 60 are simultaneously rotated.

At this time, the remaining upper part of the rotor cup 30, excluding the slots 14 and the air gap G, is blocked by means of the housing 54 of the washing machine and the stator 10. As a result, air is discharged to the outside of the motor only through the slots 14 and the air gap G so that the motor is cooled.

In the above-mentioned conventional art, however, the stator 10 is placed adjacent to the rotor 20 since the electromagnetic force becomes larger as the stator 10 gets near to the rotor 20. For example, the air gap G is set to below 0.7 mm in order that the rotor 20 can be rotated, and the slots 14 are very small in order to increase the rotation efficiency of the motor. As a result, external air introduced through the cooling-holes 34 cannot smoothly flow to the upper part of the rotor cup 30 through the air gap G and the slots 14. Consequently, the motor cannot be sufficiently cooled, whereby heat loss of the motor is high, and the motor is easily deteriorated.

SUMMARY OF THE INVENTION

Therefore, the present invention has been made in view of the above problems, and it is an object of the present invention to provide a motor that can be sufficiently cooled by means of smooth flow of external air, and a washing machine with the same mounted therein.

In accordance with one aspect of the present invention, the above and other objects can be accomplished by the provision of a motor comprising: a stator; a rotor rotatably disposed around the stator; and a rotor cup having cooling-holes formed at the bottom part thereof for allowing external air to flow into the inside of the rotor cup therethrough, and lower blades formed at the bottom part thereof for generating a blowing force, the rotor being fixed to the rotor cup at the inner circumference thereof, wherein the lower blades and the cooling-holes are formed such that each of the lower blades and the cooling-holes is at a prescribed angle to the radial direction of the rotor cup.

Preferably, the rotor is provided at the upper side thereof with upper blades for supplying external air to the upper part of the rotor when the rotor is rotated.

Preferably, the rotor cup is provided at the circumference thereof with vents for allowing the air introduced into the inside of the rotor cup to be discharged therethrough.

In accordance with another aspect of the present invention, there is provided a washing machine comprising: a case; an outer tub mounted in the case; an inner tub rotatably mounted in the outer tub; a rotating shaft connected to the inner tub; and a motor mounted to the outer tub such that the motor is connected to the rotating shaft, wherein the motor has the same structure and operation as the motor according to the present invention as described above.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
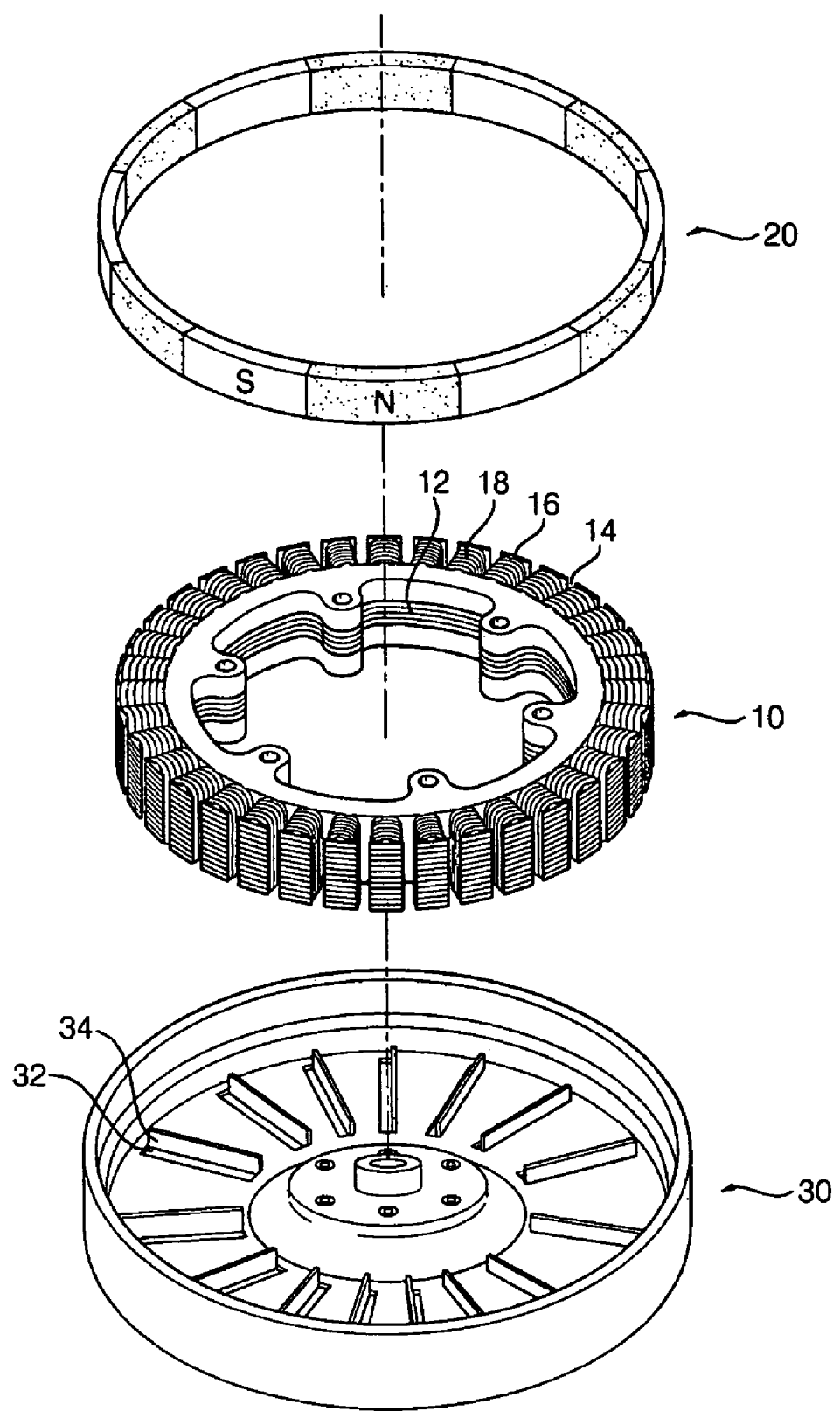
FIG. 1 is an exploded perspective view of a conventional motor.
Figure 2:
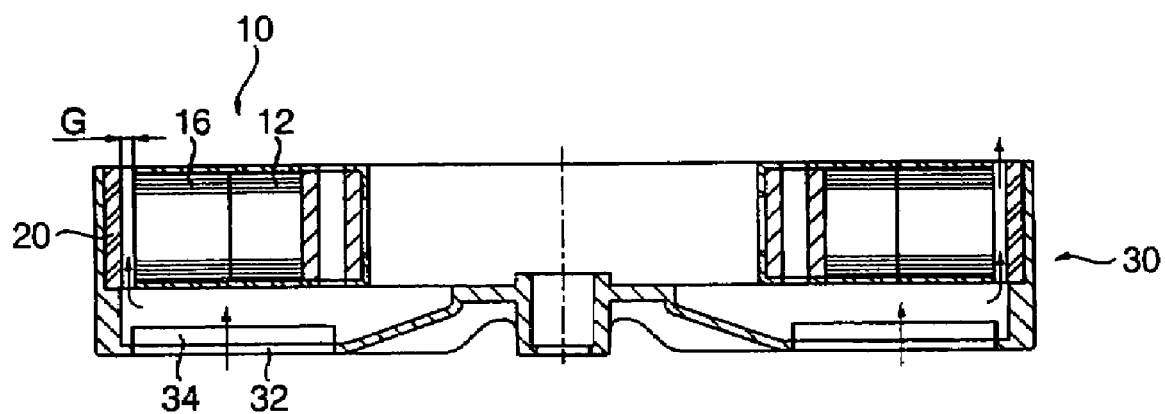
FIG. 2 is a side view, in section, of the conventional motor.
Figure 3:
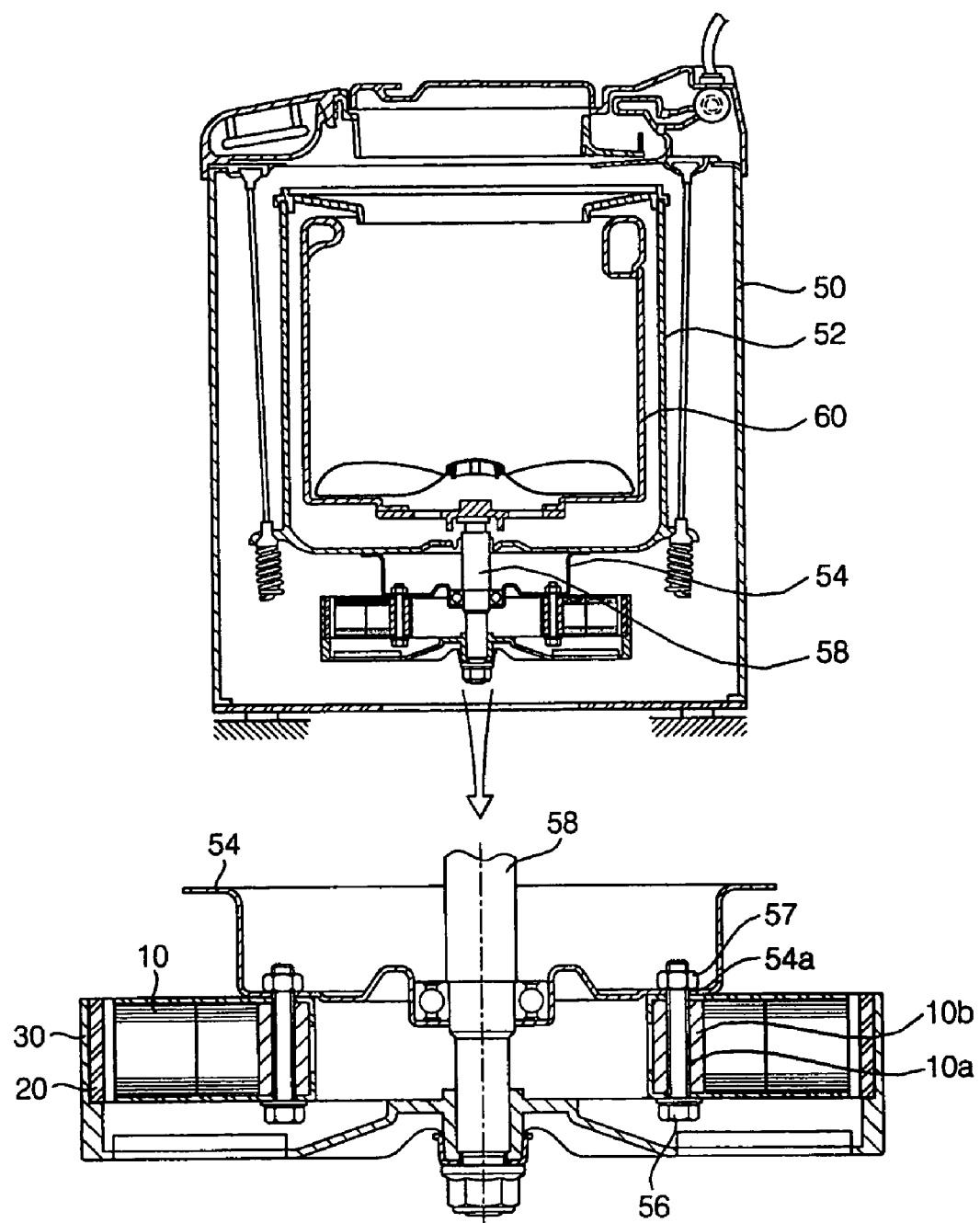
FIG. 3 is a side view, in section, of the conventional motor mounted in a conventional washing machine.
Figure 4:
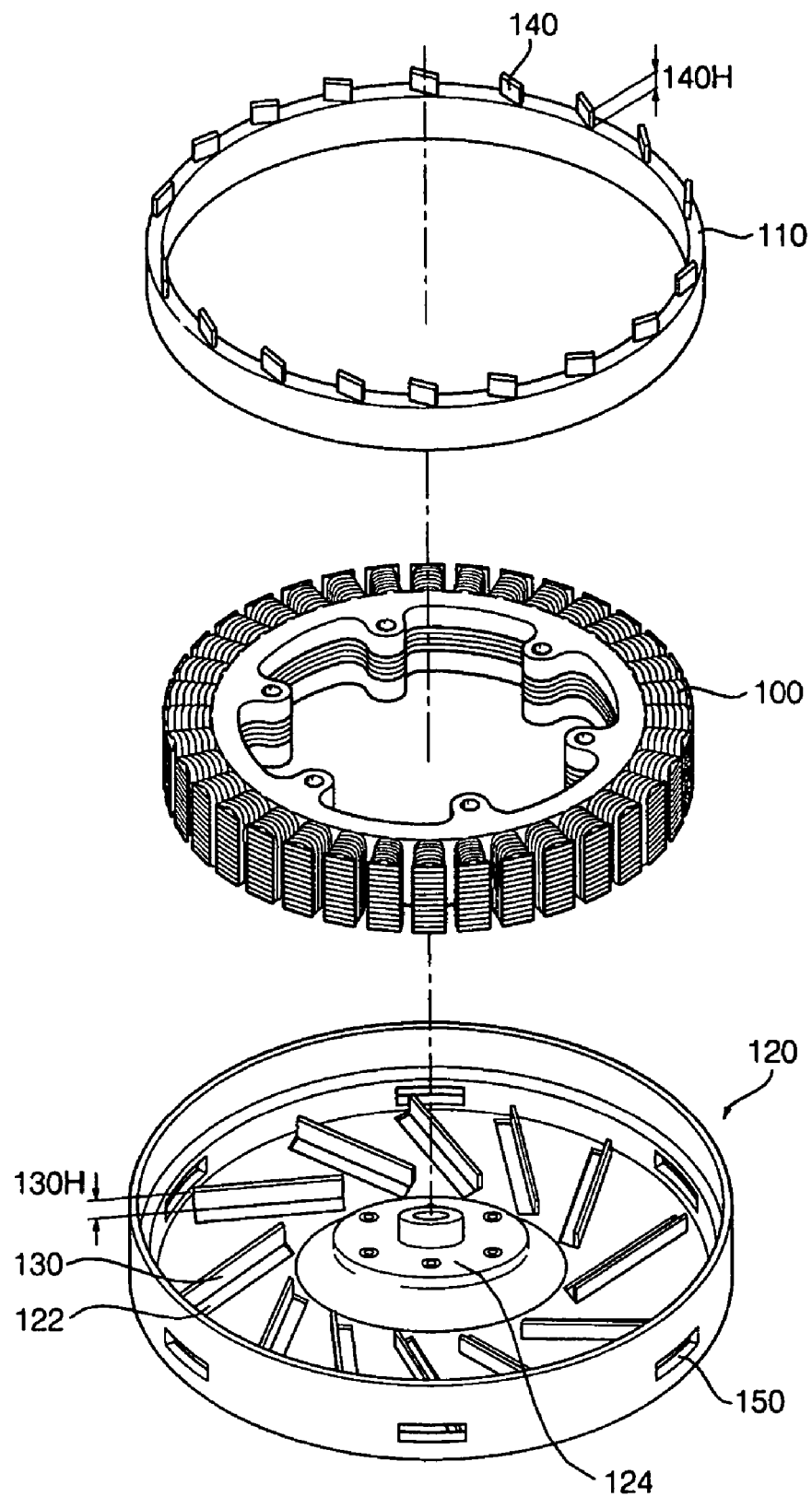
FIG. 4 is an exploded perspective view of a motor according to the present invention.
Figure 5:
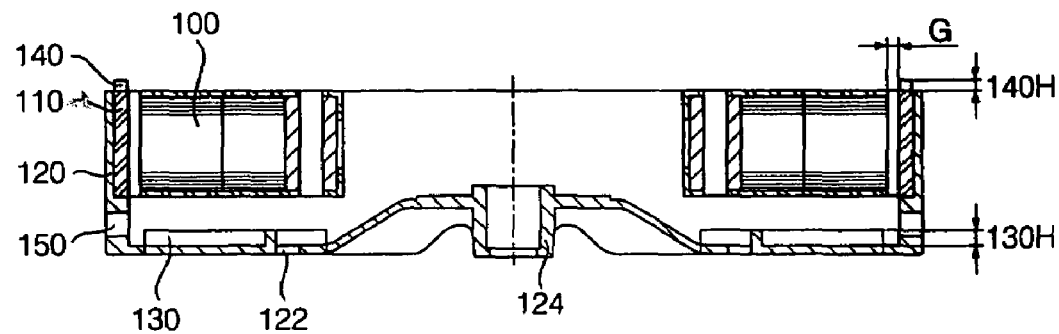
FIG. 5 is a side view, in section, of the motor according to the present invention.
Figure 6:
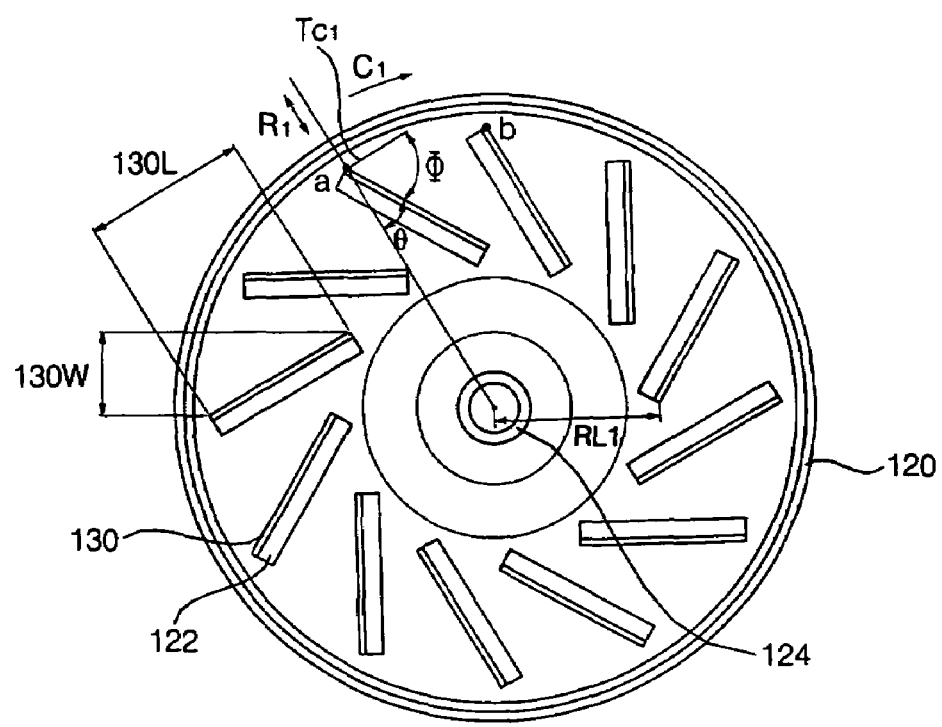
FIG. 6 is a plan view of a rotor cup according to the present invention.

As shown in FIGS. 4 to 6, a motor according to a first preferred embodiment of the present invention comprises: a stator 100; a rotor 110 rotatably disposed around the stator 100 while the rotor 110 is spaced apart from the stator 100 by a prescribed distance of air gap G, the rotator being rotated when electric current is supplied to the stator 100; and a rotor cup 120 having an opened upper part, the rotor cup 120 also having a plurality of rectangular cooling-holes 122 formed at the bottom part thereof for allowing external air to flow into the inside of the rotor cup 120 therethrough, and lower blades 130 formed at the bottom part thereof while being protruded upward, each of the lower blades 130 being placed at one side of the respective cooling-holes 122 for generating a blowing force so that the external air is introduced into the inside of the rotor cup 120 through the cooling-holes 122 when the rotor-cup 120 is rotated. The rotor 110 is fixed to the rotor cup 120 at the inner circumference thereof. The lower blades 130 and the cooling-holes 122 are formed such that each of them is at a prescribed angle θ to the radial direction $R_1$ of the rotor cup 120 so that more external air can be introduced into the inside of the rotor cup 120 through the cooling-holes 122.

In the motor according to the present invention, therefore, the length 130L of each of the lower blades 130 is increased as compared to the conventional motor in which the lower blades 130 are extended from the center of a boss 124 of the rotor cup 120 toward the outer circumference of the rotor cup 120 in the radial direction $R_1$ of the rotor cup 120. Consequently, the motor according to the present invention has an increased blowing force. Also, the external air-introduction area provided by the cooling-holes 122 of the motor according to the present invention is increased as compared to the conventional motor in which the cooling-holes 122 are arranged in the radial direction $R_1$ of the rotor cup 120. Consequently, the amount of external air introduced into the inside of the rotor cup 120 is increased, whereby the cooling efficiency of the motor is improved.

Additionally, the length 130L of each of the lower blades 130 formed at the bottom part of the rotor cup 120 is increased, whereby the rotor cup 120 is further reinforced.

Figure 7:
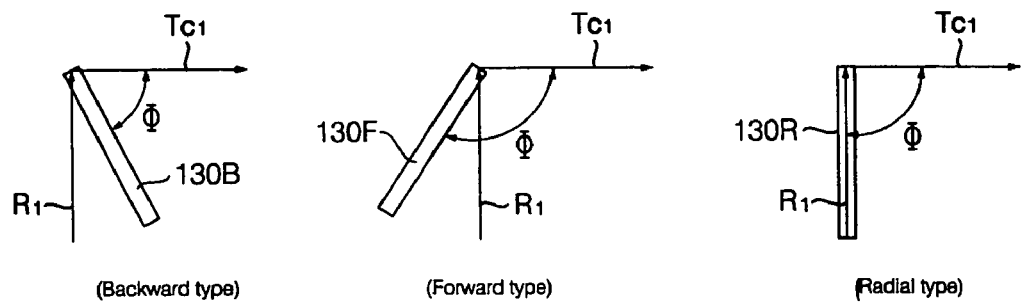
FIG. 7 is a view showing various types of blades.

Especially, the lower blades 130 are formed in such a manner that each of the lower blades 130 is at a prescribed angle θ to the radial direction $R_1$ of the rotor cup 120. Referring to FIG. 7, each of the lower blades 130 may be formed of a backward type 130B in which a sloping angle Φ of the lower blade 130 at the outer end thereof to the line $Tc_1$ extended in the rotating direction $C_1$ of the lower blade 130, which is perpendicular to the radial direction $R_1$ of the rotor cup 120, is an acute angle. Alternatively, each of the lower blades 130 may be formed of a forward type 130F in which the sloping angle Φ of the lower blade 130 is an obtuse angle.

In the case that the sloping angle Φ of the lower blade 130 is a right angle, the lower blade 130 is formed of a radial type 130R as in the conventional motor.

An analysis of velocity fields of air will now be given on the basis of the types of the lower blades 130 With reference to FIGS. 8a to 8c.

Figure 8A:
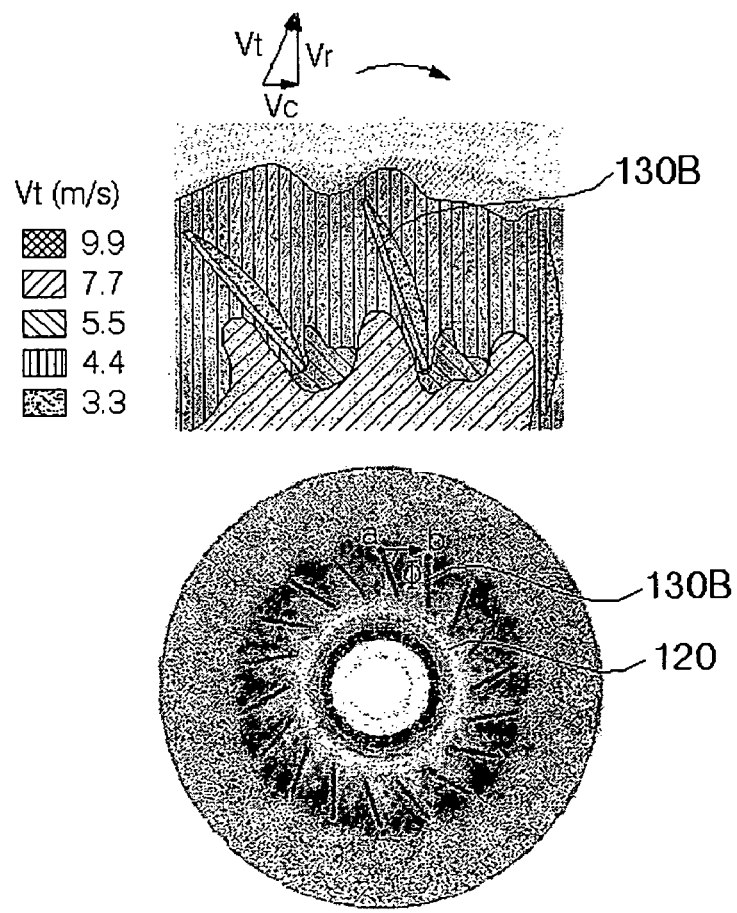
FIG. 8a is a view showing a velocity field of air in the case that each of the lower blades according to the present invention is of a backward type.
Figure 8B:
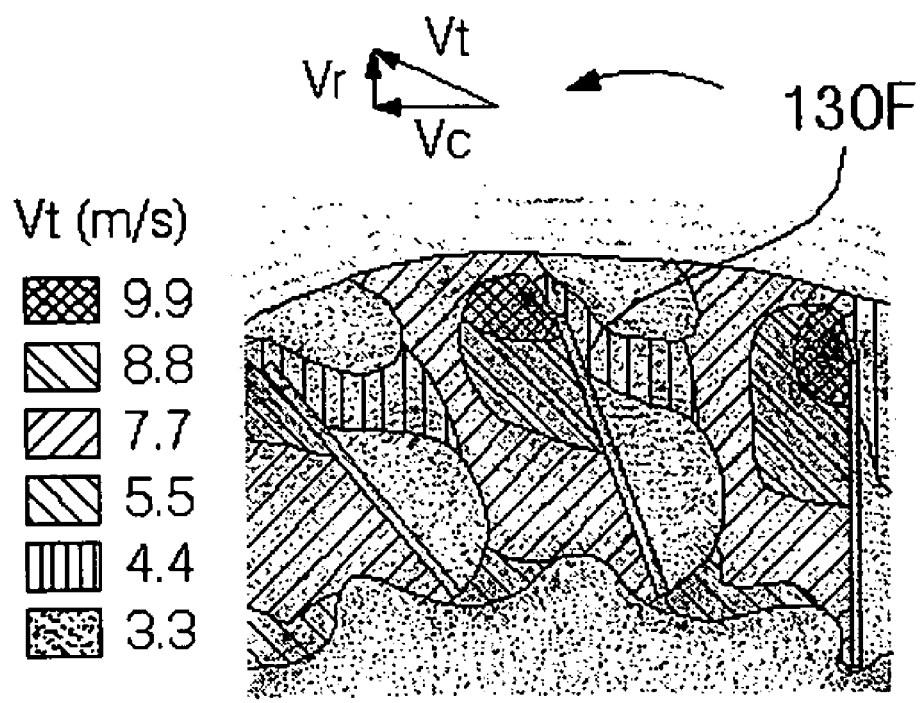
FIG. 8b is a view showing a velocity field of air in the case that each of the lower blades according to the present invention is of a forward type.
Figure 8B:
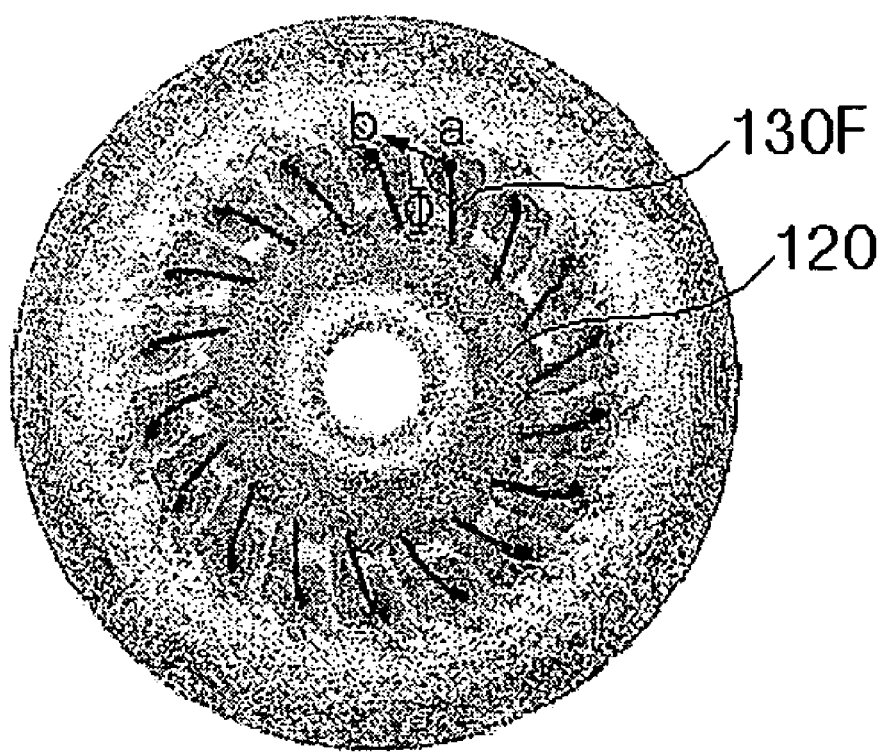
Figure 8C:
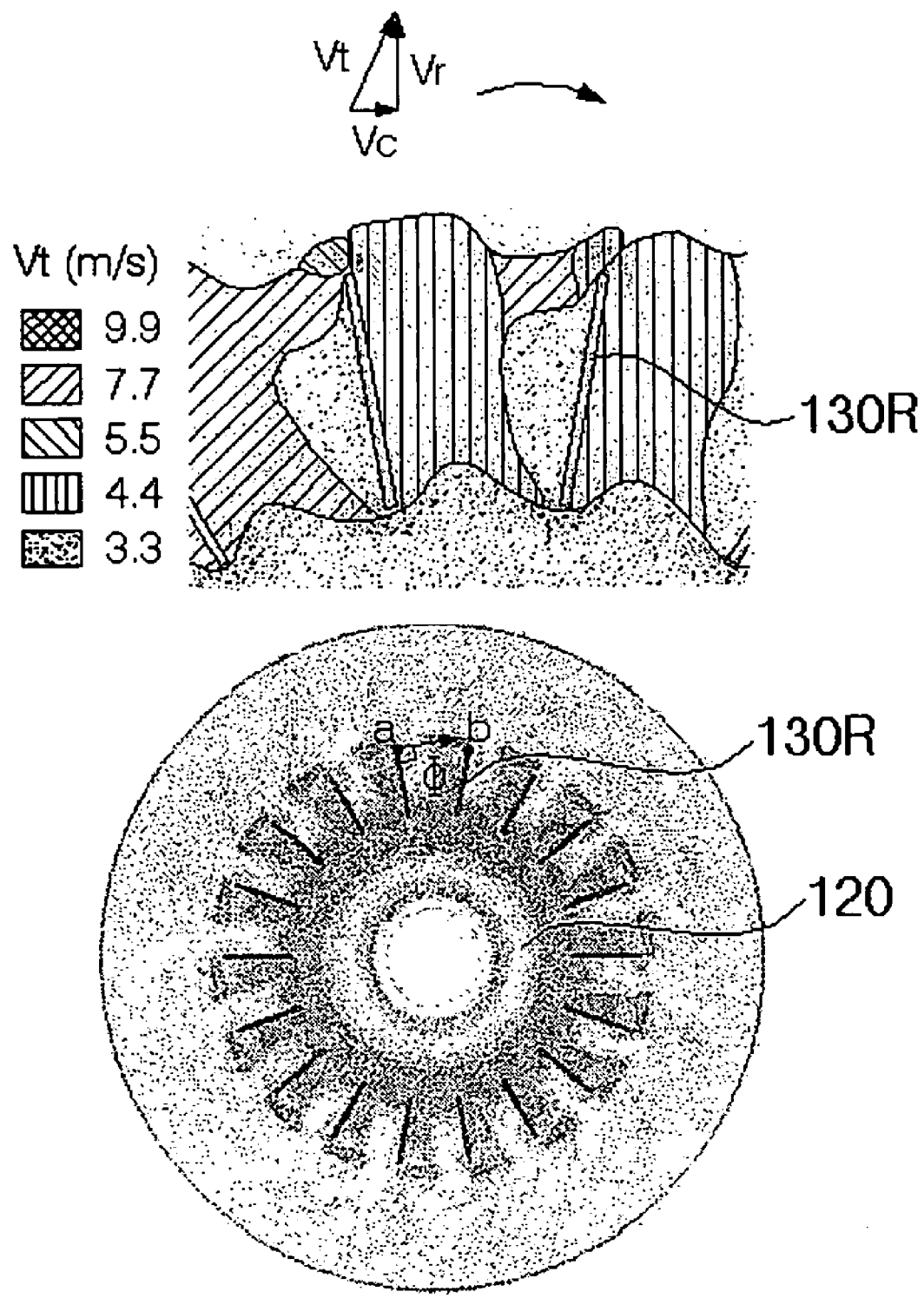
FIG. 8c is a view showing a velocity field of air in the case that each of the lower blades according to the present invention is of a radial type.

FIG. 8a is a view showing a velocity field of air in the rotor cup 120 when each of the lower blades 130 is formed of a backward type in which the sloping angle Φ of the lower blade 130 is 60 degrees, FIG. 8b is a view showing a velocity field of air at the rotor cup 120 when each of the lower blades 130 is formed of a forward type in which the sloping angle Φ of the lower blade 130 is 120 degrees, and FIG. 8c is a view showing a velocity field of air in the rotor cup 120 when each of the lower blades 130 is formed of a radial type in which the sloping angle Φ of the lower blade 130 is 90 degrees. At the lower parts of FIGS. 8a to 8c are shown the entire velocity fields of air at the rotor cup 120, and at the upper parts of FIGS. 8a to 8c are shown an enlarged scale of the partial velocity fields of air at the rotor cup 120. In FIGS. 8a to 8c, reference character Vr indicates flow rate of air in the radial direction, reference character Vc indicates flow rate of air in the circumferential direction, and reference character Vt indicates the actual flow rate of air, which is the sum of the flow rate of air in the radial direction Vr and the flow rate of air in the circumferential direction Vc.

The experimental conditions were as follows: the radial distance RL1 from the center of the rotor cup 120 to the inner end of each of the lower blades 130 is 60 mm, the length 130L of each of the lower blades 130 is 31 mm, the rotating speed of the motor is 600 rpm, the number of the blades is 18, and the height 130H of each of the lower blades 130 is 15 mm.

It can be seen from FIGS. 8a to 8c that the actual flow rate Vt of air is the largest when the lower blade 130 is formed of the forward type as shown in FIG. 8b, and the actual flow rate Vt of air is the smallest when the lower blade 130 is formed of the radial type as shown in FIG. 8c. The actual flow rate Vt of air when the lower blade 130 is formed of the backward type as shown in FIG. 8a is between the actual flow rate Vt of air when the lower blade 130 is formed of the forward type as shown in FIG. 8b and the actual flow rate Vt of air when the lower blade 130 is formed of the radial type as shown in FIG. 8c. The radial flow rate Vr of air is the largest when the lower blade 130 is formed of the backward type as shown in FIG. 8a, and the radial flow rate Vr of air is the smallest when the lower blade 130 is formed of the forward type as shown in FIG. 8b. The radial flow rate Vr of air when the lower blade 130 is formed of the radial type as shown in FIG. 8c is between the radial flow rate Vr of air when the lower blade 130 is formed of the backward type as shown in FIG. 8a and the radial flow rate Vr of air when the lower blade 130 is formed of the forward type as shown in FIG. 8b.

Figure 9:
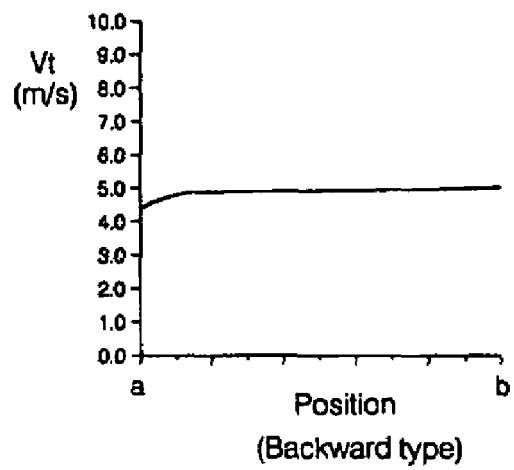
FIG. 9 is a graph showing actual flow rates of air at the respective positions in the rotating direction over a line segment connecting outer ends between the lower blades on the basis of the types of the lower blades according to the present invention.
Figure 9:
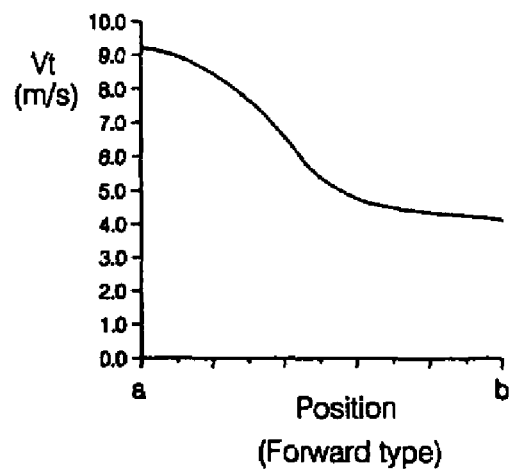
Figure 9:
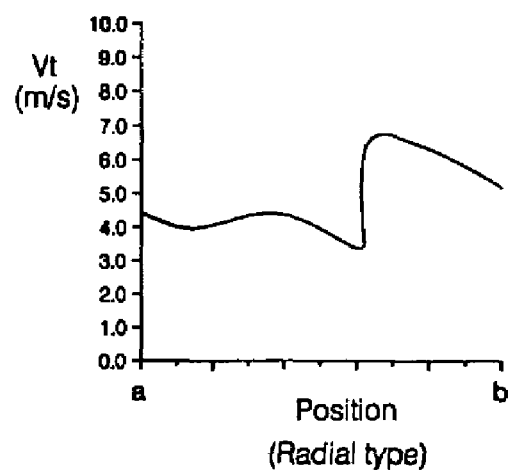

FIG. 9 is a graph showing actual flow rates Vt of air at the respective positions in the rotating direction over a line segment $\overline{ab}$ connecting outer ends a and b between the lower blades 130 on the basis of the velocity fields of air as shown in FIGS. 8a to 8c, and FIG. 10 is a graph showing radial flow rates Vr of air at the respective positions in the rotating direction over a line segment $\overline{ab}$ connecting outer ends a and b between the lower blades 130 on the basis of the velocity fields of air as shown in FIGS. 8a to 8c.

Figure 10:
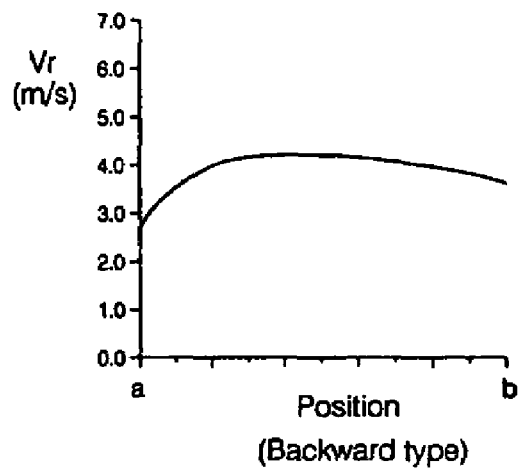
FIG. 10 is a graph showing radial flow rates of air at the respective positions in the rotating direction over a line segment connecting outer ends between the lower blades on the basis of the types of the lower blades according to the present invention.
Figure 10:
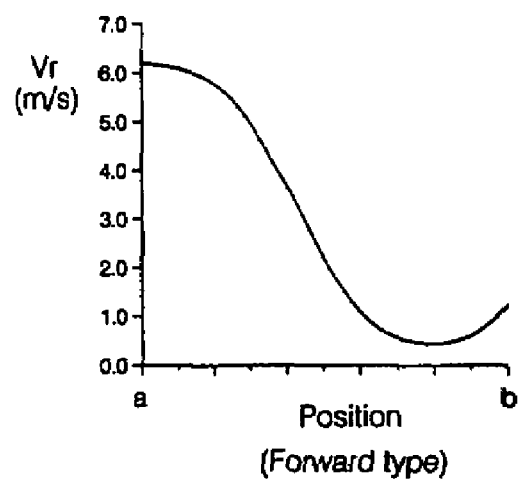
Figure 10:
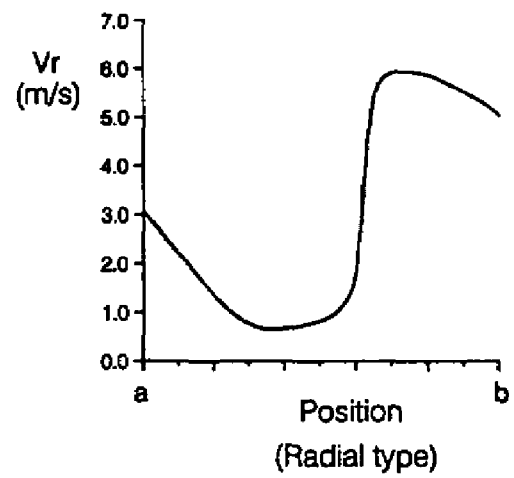

Average actual flow rates Vt of air and average radial flow rate Vr of air on the basis of the types of the lower blades 130 are calculated from the graphs of FIGS. 9 and 10, which are indicated in Table 1.

TABLE 1

| Type of lower blade | Air volume (kg/s) | Radial flow rate of air (Vr) (m/s) | Actual flow rate of air (Vt) (m/s) |
| --- | --- | --- | --- |
| Backward type | 2.613 | 3.608 | 4.614 |
| Forward type | 1.621 | 2.242 | 6.124 |
| Radial type | 1.961 | 2.703 | 4.565 |

It can be seen from Table 1 with reference to FIGS. 8a to 10 that the actual flow rate Vt of air is the largest when each of the lower blades 130 is formed of the forward type 130F, whereas the radial flow rate Vr of air, which is connected with the air volume, is the smallest when each of the lower blades 130 is formed of the forward type 130F. In other words, the air volume when each of the lower blades 130 is formed of the forward type 130F is smaller than the air volume when each of the lower blades 130 is formed of the conventional radial type 130R. Consequently, it is preferable that each of the lower blades 130 is at a prescribed angle to the radial direction $R_1$ of the rotor cup 120, and each of the lower blades 130 is formed of the backward type 130B. The air volume when each of the lower blades 130 is formed of the backward type 130B is 30% larger than the air volume when each of the lower blades 130 is formed of the radial type 130R.

The length 130L of each of the lower blades 130 is increased as the angle θ of the respective lower blades 130 to the radial direction $R_1$ of the rotor cup 120 in the rotating direction $C_1$ of the rotor cup 120 is increased, whereby the actual flow rate Vt of air is also increased. On the other hand, the width 130W of each of the lower blades 130 is increased as the angle θ of the respective lower blades 130 to the radial direction $R_1$ of the rotor cup 120 in the rotating direction $C_1$ of the rotor cup 120 is increased, whereby the number of the lower blades 130 is reduced, and thus the blowing force from the lower blades 130 is decreased.

The test results also reveal that the flow rate of air is not particularly changed when the sloping angle Φ of each of the backward type lower blades 130 is between 50 degrees and 70 degrees.

Figure 11:
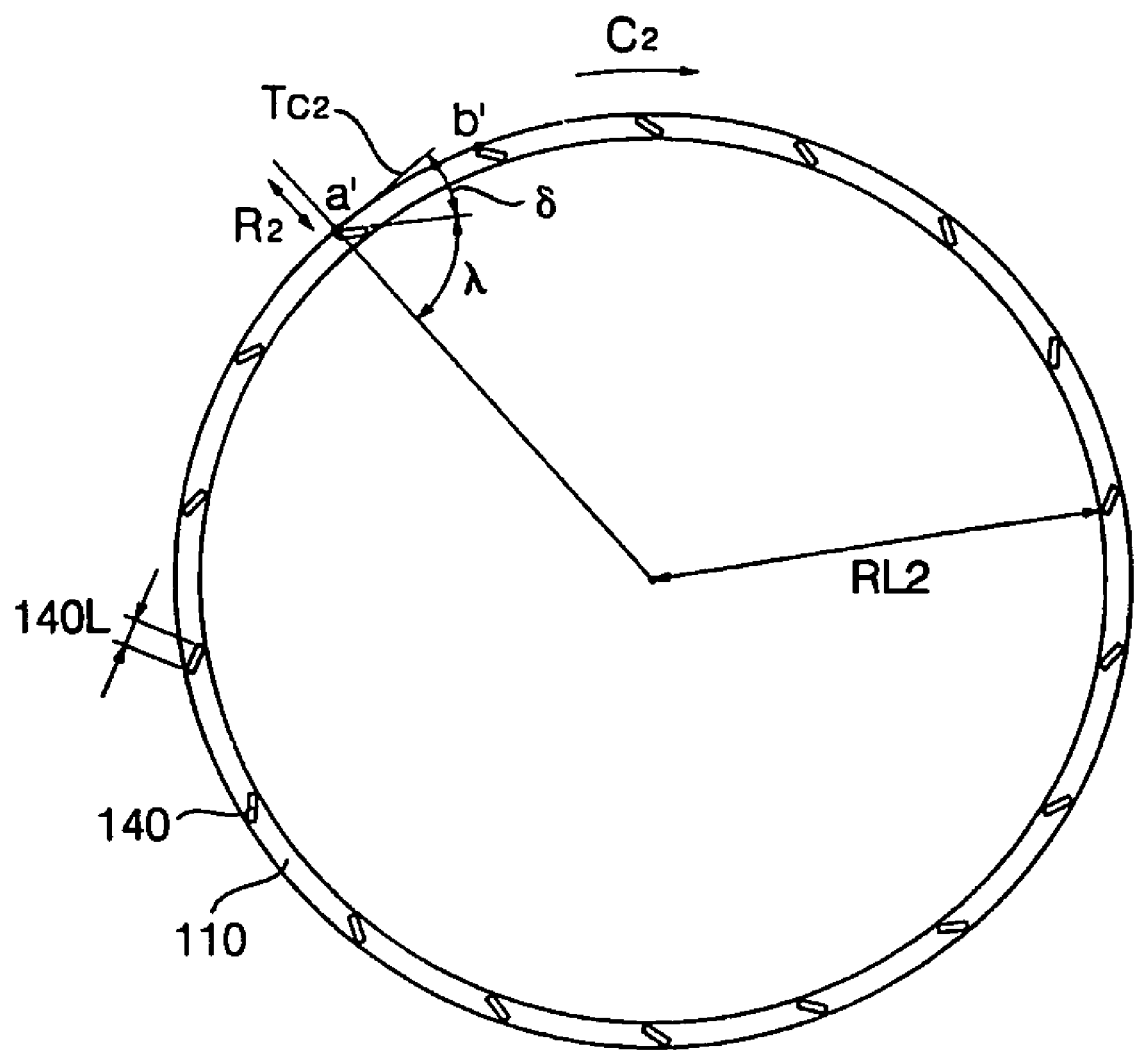
FIG. 11 is a plan view of a rotor according to the present invention.

The external air introduced into the inside of the rotor cup 120 through the cooling-holes 122 cannot easily flow to the upper parts of the rotor cup 120 since the distance of the air gap between the stator 100 and the rotor 110 is very small. On this account, an additional heat-radiating structure may be formed at the upper part of the motor. Specifically, a plurality of upper blades 140 may be formed at the upper side of the rotor 110, as shown in FIGS. 4, 5 and 11. The upper blades 140 serve to blow air outwardly from the center of the rotor 110 in the radial direction of the rotor 110 when the rotor 110 is rotated.

The upper blades 140 are formed such that each of the upper blades 140 is at a prescribed angle to the line $Tc_2$ extended in the rotating direction $C_2$ of the rotor 110, which is perpendicular to the radial direction $R_2$ of the rotor 110. As in the lower blades 130, each of the upper blades 140 may be formed of a backward type in which a sloping angle δ of the upper blade 140 is an acute angle, or each of the upper blades 140 may be formed of a forward type in which the sloping angle δ of the upper blade 140 is an obtuse angle. Alternatively, each of the upper blades 140 may be formed of a radial type in which the sloping angle δ of the upper blade 140 is a right angle.

An analysis of velocity fields of air will now be given on the basis of the above-mentioned types of the upper blades 140, i.e., the backward type upper blades 140 having a sloping angle δ of 60 degrees, the forward type upper blades 140 having a sloping angle δ of 120 degrees, and the radial type upper blades 140 having a sloping angle δ of 90 degrees, under the experimental conditions where the radial distance RL2 from the center of the rotor cup 120 to the inner end of each of the upper blades 140 is 89.5 mm, the length 140L of each of the upper blades 130 is 12 mm, the rotating speed of the motor is 2000 rpm, and the number of the blades is 18, which is similar to the analysis of velocity fields of air with reference to FIGS. 8a to 8c.

Figure 12:
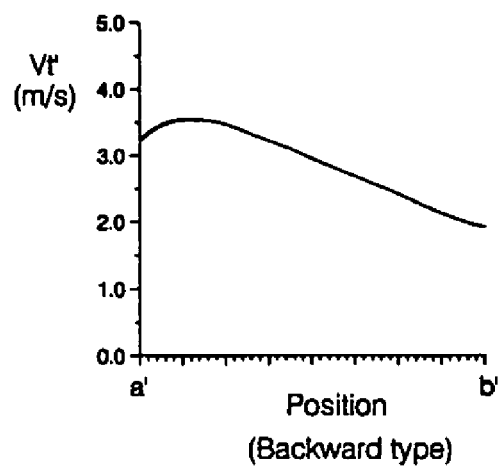
FIG. 12 is a graph showing actual flow rates of air at the respective positions in the rotating direction over a line segment connecting outer ends between upper blades on the basis of the types of the upper blades according to the present invention.
Figure 12:
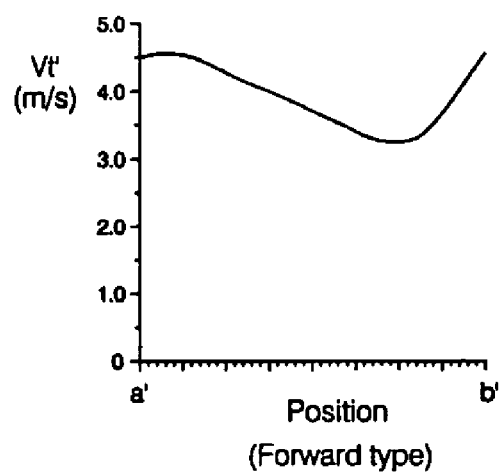
Figure 12:
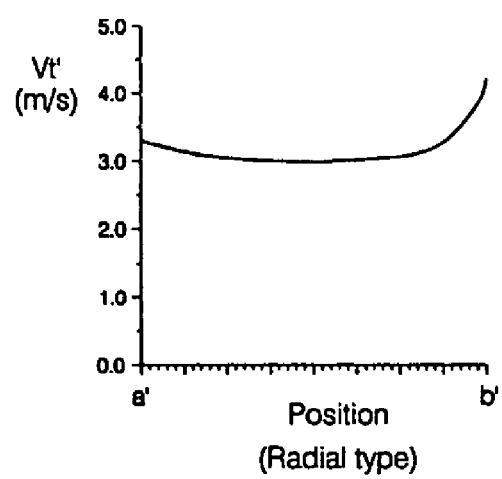
Figure 13:
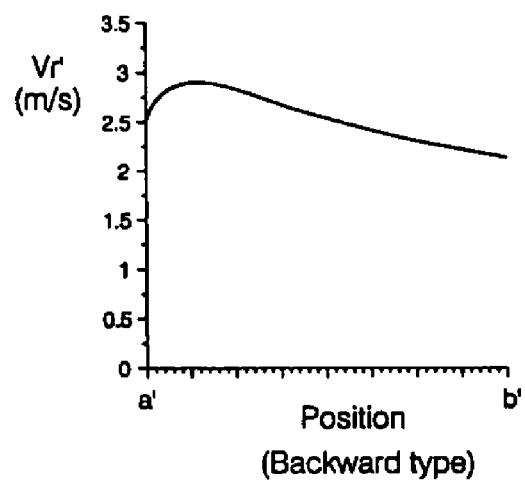
FIG. 13 is a graph showing radial flow rates of air at the respective positions in the rotating direction over a line segment connecting outer ends between the upper blades on the basis of the types of the upper blades according to the present invention.
Figure 13:
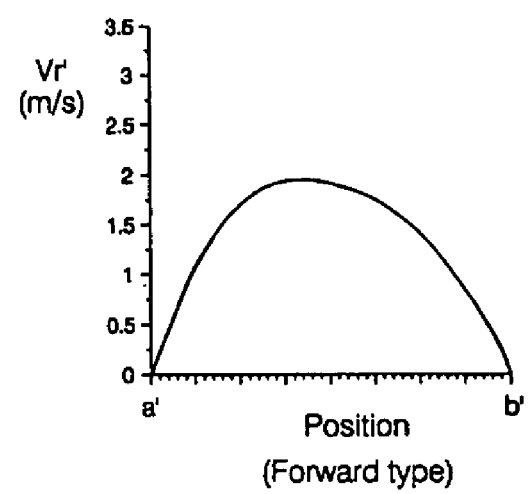
Figure 13:
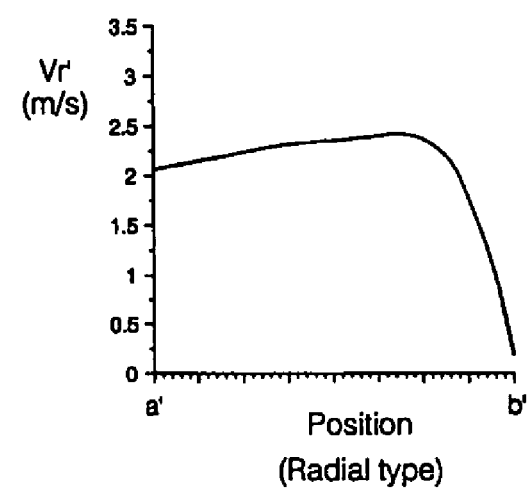

The results of analysis of the velocity fields of air on the basis of the types of the upper blades 140 are shown in FIGS. 12 and 13, and average actual flow rates Vt' of air and average radial flow rate Vr' of air on the basis of the types of the upper blades 140 are calculated from the graphs of FIGS. 12 and 13, which are indicated in Table 2.

Reference characters a' and b', which are indicated below the horizontal axes of FIGS. 12 and 13, indicate positions of the radial outer ends of the upper blades 140 between one of the upper blades 140 and the neighboring upper blade.

TABLE 2

| Type of upper blade | Air volume (kg/s) | Radial flow rate of air (Vr') (m/s) | Actual flow rate of air (Vt') (m/s) |
| --- | --- | --- | --- |
| Backward type | 2.006 | 2.553 | 2.772 |
| Forward type | 0.7755 | 0.98 | 4.157 |
| Radial type | 1.591 | 2.021 | 3.156 |

It can be seen from Table 2 with reference to FIGS. 12 and 13 that the actual flow rate Vt' of air is the largest when each of the upper blades 140 is formed of the forward type, whereas the radial flow rate Vr' of air, which is connected with the air volume, is the smallest when each of the upper blades 140 is formed of the forward type. In other words, the air volume when each of the upper blades 140 is formed of the forward type is smaller than the air volume when each of the upper blades 140 is formed of the radial type, which is a conventional art. Consequently, it is preferable that each of the upper blades 140 is at a prescribed angle to the radial direction $R_2$ of the rotor 110, and each of the upper blades 140 is formed of the backward type. The air volume when each of the upper blades 140 is formed of the backward type is 20% larger than the air volume when each of the upper blades 140 is formed of the conventional radial type.

The length 140L of each of the upper blades 140 is increased as the angle $\lambda$ of the respective upper blades 140 to the radial direction $R_2$ of the rotor 110 in the rotating direction $C_2$ of the rotor 110 is increased, whereby the actual flow rate Vt of air is also increased. Consequently, it is preferable that the sloping angle $\delta$ of each of the upper blades 140 at the outer end thereof in the radial direction of the rotor 110 to the line $Tc_2$ extended in the rotating direction $C_2$ of the upper blade 140, which is perpendicular to the radial direction $R_2$ of the rotor 110, is not more than 45 degrees.

Figure 14:
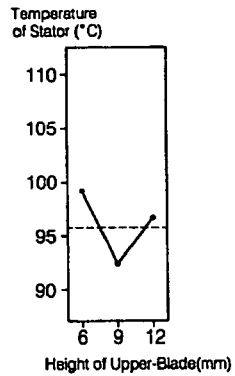
FIG. 14 is a graph showing the temperature of a stator on the basis of the height of the upper blades according to the present invention.

FIG. 14 is a graph showing the temperature of the stator 100 on the basis of the height 140H of each of the upper blades 140. As the height 140H of each of the upper blades 140 is increased, the blowing range of air is increased, whereby a large amount of air volume is generated. When the upper blades are excessively high, however, effective air volume of air supplied to the stator 100 is reduced. Consequently, it is preferable that the height 140H of each of the upper blades 140 is between 6 mm and 12 mm.

At the lower part of the circumference of the rotor cup 120 are formed a plurality of vents 150 in the circumferential direction, through which heat generated in the inside of the rotor cup 120 due to heat-radiation of the stator 100 is discharged to the outside, as shown in FIGS. 4 and 5, whereby ventilation of the motor is smoothly accomplished.

Figure 15:
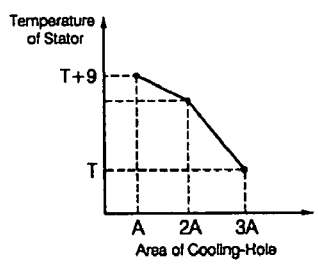
FIG. 15 is a graph showing the temperature of the stator on the basis of the area of cooling-holes according to the present invention.
Figure 16:
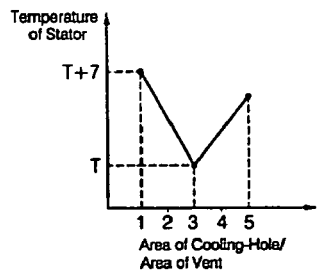
FIG. 16 is a graph showing the temperature of the stator on the basis of the ratio of the area of cooling-holes to the area of vents according to the present invention.

As can be seen from FIG. 15, air volume of the external air blown into the inside of the rotor cup 120 is increased as the area of each of the cooling-holes 122 is increased, whereby heat-radiation efficiency of the stator 110 is improved. As can also be seen from FIG. 16, however, the external air introduced through the cooling-holes 122 does not flow to the vents 150 but flow backward to the cooling-holes 122 when the whole areas of the cooling-holes 122 are excessively large as compared to the whole areas of the vents 150. Consequently, it is preferable that the ratio of the whole areas of the cooling-holes 122 to the whole areas of the vents 150 is 2:1 to 4:1.

Now, the operation of the motor with the above-stated construction according to the present invention will be described in detail.

When electric current is supplied to the stator 100, there is generated an electromagnetic force between the stator 100 and the rotor 110. As a result, the rotor 110 and the rotor cup 120 are rotated in one direction to generate a driving force.

At this time, the lower blades 130 are rotated along with the rotor cup 120. Consequently, external air is introduced into the inside of the rotor cup 120 by means of a blowing force from the lower blades 130 so that the stator 100 is cooled. Since the lower blades 130 and the cooling-holes 122 are at a prescribed angle to the radial direction of the rotor cup 120, the blowing force generated by means of the lower blades 130 is increased. Since the area of the cooling-holes 122 is large, air volume of the external air introduced through the cooling-holes is increased so that the lower part of the motor is sufficiently cooled.

The vents 150 are formed at the circumference of the rotor cup 120, whereby the air introduced into the inside of the rotor cup 120 is discharged to the outside through the vents 150 as well as the narrow air gap G provided between the stator 100 and the rotor 110. Consequently, the ventilation is smoothly achieved, and thus cooling efficiency of the motor is improved.

Also, external air is blown to the upper part of the motor as the upper blades 140 are rotated along with the rotor 110. Consequently, the upper part of the motor is sufficiently cooled even though the external air introduced through the cooling-holes 122 is not smoothly supplied to the upper part of the motor through the narrow air gap G provided between the stator 100 and the rotor 110.

A motor according to a second preferred embodiment of the present invention comprises: a stator; a rotor rotatably disposed around the stator; and a rotor cup having cooling-holes formed at the bottom part thereof for allowing external air to flow into the inside of the rotor cup therethrough and lower blades also formed at the bottom part thereof for generating a blowing force. The rotor is fixed to the rotor cup at the inner circumference thereof. According to this embodiment, an additional heat-radiating structure may be formed at the upper part of the motor. Specifically, upper blades may be formed at the upper side of the rotor. The upper blades serve to blow external air to the upper part of the rotor when the rotor is rotated.

At the lower part of the circumference of the rotor cup may be formed vents for allowing the air introduced into the inside of the rotor cup to be discharged therethrough so that ventilation of the motor is smoothly accomplished.

A motor according to a third preferred embodiment of the present invention comprises: a stator; a rotor rotatably disposed around the stator; and a rotor cup having cooling-holes formed at the bottom part thereof for allowing external air to flow into the inside of the rotor cup therethrough and lower blades also formed at the bottom part thereof for generating a blowing force. The rotor is fixed to the rotor cup at the inner circumference thereof. At the lower part of the circumference of the rotor cup is formed vents for allowing the air introduced into the inside of the rotor cup to be discharged therethrough so that ventilation of the motor is smoothly accomplished.

The motor according to the second preferred embodiment of the present invention and the motor according to the third preferred embodiment of the present invention are similar to the motor according to the first preferred embodiment of the present invention. Therefore, further detailed descriptions of the motors according to the second and third preferred embodiments of the present invention with reference to related drawings will not be given.

The motor with the above-stated construction according to the present invention may be applied to a washing machine that is operated by means of a driving force generated by means of a motor.

Figure 17:
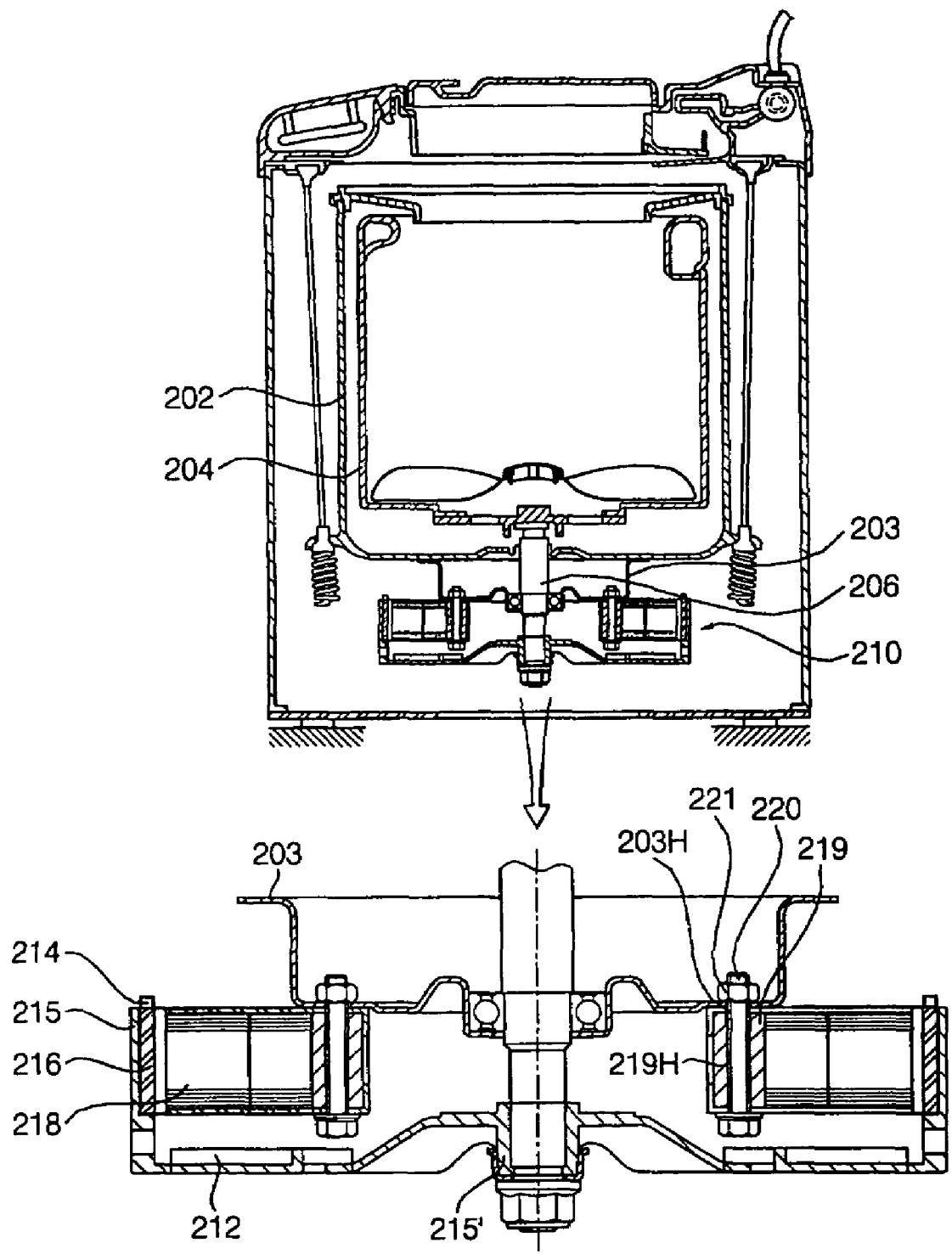
FIG. 17 is a side view, in section, of a fully automatic washing machine according to the present invention.

A fully automatic washing machine according to the present invention, to which the motor according to one of the first to third preferred embodiments of the present invention is applied, is shown in FIG. 17.

As shown in FIG. 17, the fully automatic washing machine according to the present invention comprises: a case 200; an outer tub 202 mounted in the case 200; an inner tub 204 rotatably mounted in the outer tub 202; and a motor 210 mounted to the outer bottom part of the outer tub 202, the motor 210 being connected to the inner tub 204 via a rotating vertical shaft 206 for rotating the inner tub 204. The motor 210 has the same structure and operation as the motor according to one of the first to third preferred embodiments of the present invention. Therefore, a detailed description of the motor mounted in the fully automatic washing motor according to the present invention will not be given.

When the washing machine is operated, the inner tub 204 is alternately rotated in forward and reverse directions. Also, the inner tub 204 is rotated at higher speed as compared to the inner tube of a washing machine that is rotated only in one direction. As a result, a larger amount of heat is generated from the motor 210 when the laundry is washed than when the laundry is dewatered. On this account, lower blades 212 and upper blades 214 of the motor are formed of the backward type, which has already been described in detail above, on the basis of the rotating direction of the rotor 216 when the laundry is dewatered so that the motor 210 is sufficiently cooled when the laundry is dewatered.

At the outer bottom part of the outer tub 202 is fixed a housing 203. At the inner circumference of a stator 218 of the motor 210 is provided a boss 219 having fixing-holes 219H, which vertically communicate with fixing-holes 203H of The housing 203. Bolts 220 are inserted through the fixing-holes 203H of the housing 203 and the fixing-holes 219H of the boss 219, and are then securely engaged in nuts 221 at the ends of the bolts 220 as shown in FIG. 17, so that the stator 218 is fixed to the outer tub 202 via the housing 203 of the washing machine.

A rotor cup 215 of the motor 210 is provided at the center of the bottom part thereof with a boss 215', in which the rotating shaft 206 is forcibly inserted so that the rotor cup 215 is rotated along with the rotating shaft 206.

Figure 18:
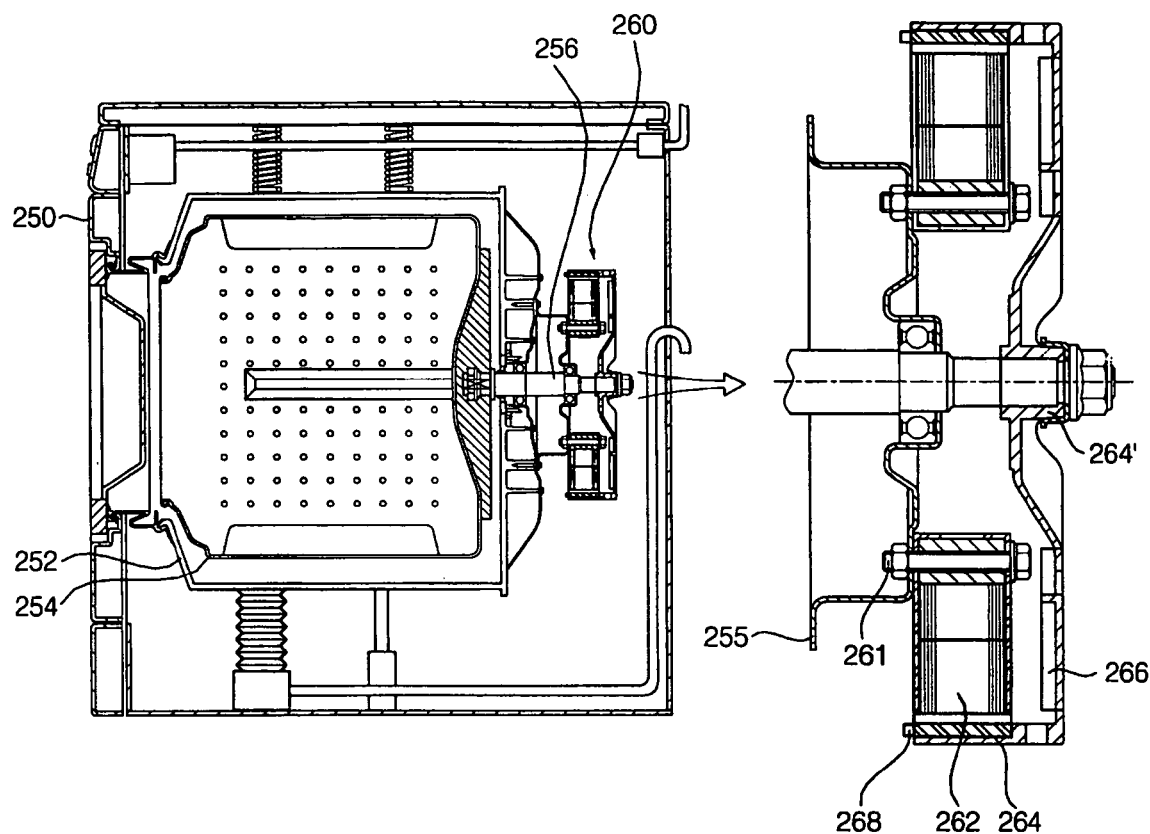
FIG. 18 is a side view, in section, of a drum washing machine according to the present invention.

A drum washing machine according to the present invention, to which the motor according to one of the first to third preferred embodiments of the present invention is applied, is shown in FIG. 18.

As shown in FIG. 18, the drum washing machine according to the present invention comprises: a case 250; an outer tub 252 mounted in the case 200; an inner tub 254 rotatably mounted in the outer tub 252; and a motor 260 mounted to the outer rear part of the outer tub 252, the motor 260 being connected to the inner tub 254 via a rotating horizontal shaft 256 for rotating the inner tub 254. The motor 260 has the same structure and operation as the motor according to one of the first to third preferred embodiments of the present invention. Therefore, a detailed description of the motor mounted in the drum washing motor according to the present invention will not be given.

As in the above-mentioned fully automatic washing machine, a stator 262 of the motor 260 is attached to a housing 255 of the washing machine, which is securely fixed to the outer rear part of the outer tube 252, by means of bolts 261. A rotor cup 265 of the motor 260 is provided at the center of the bottom part thereof with a boss 264', in which the rotating shaft 256 is forcibly inserted so that the rotor cup 265 is rotated along with the rotating shaft 256. Lower blades 266 and upper blades 268 of the motor 260 are formed of the backward type, which has already been described in detail above, on the basis of the rotating direction of the inner tub 254 when the laundry is dewatered.

As apparent from the above description, the present invention provides a motor and a washing machine wherein cooling-holes and lower blades formed at the bottom part of a rotor cup are at a prescribed angle to the radial direction of the rotor cup. Consequently, the present invention has effects that the area of the cooling-holes is increased, and a blowing force generated by means of the lower blades is also increased. Furthermore, each of the upper blades are formed in a backward type to the rotating direction of the rotor cup, whereby air volume of external air introduced into the inside of the rotor cup is increased when a dewatering process of the washing machine is carried out, and thus cooling efficiency of the motor is improved.

At the lower part of the circumference of the rotor cup are formed a plurality of vents in the circumferential direction, through which heat generated in the inside of the rotor cup due to heat-radiation of the motor is discharged to the outside so that ventilation inside and outside the rotor cup is smoothly accomplished, whereby cooling efficiency of the motor is further improved.

Furthermore, the present invention further comprises upper blades provided at the upper side of the rotor, each of which is formed in a backward type to the rotating direction of the rotor so that external air is supplied to the motor when a dewatering process of the washing machine is carried out. Consequently, the upper part of the motor is sufficiently cooled by means of the upper blades even though the external air introduced through the cooling-holes is not smoothly supplied to the upper part of the motor through a narrow air gap provided between the stator and the rotor, whereby cooling efficiency of the motor is further improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motor comprising:

a stator;

a rotor rotatably disposed around the stator; and a rotor cup having cooling-holes formed at the bottom part thereof for allowing external air to flow into the inside of the rotor cup therethrough, and lower blades formed at the bottom part thereof for generating a blowing force, the rotor being fixed to the rotor cup at the inner circumference thereof, wherein each of the lower blades protrudes from one side of each of the cooling-holes towards the stator, wherein each of the lower blades and the cooling-holes has an acute sloping angle to the line extended in the rotating direction of the rotor cup and perpendicular to the radial direction of the rotor cup, and wherein a plurality of upper blades are located above the top of the rotor for discharging external air, which flows into the rotor cup through the cooling-holes formed at the bottom part of the rotor and then passes through the stator, to outside of the rotor cup, and wherein a plurality of vents are located at a lower circumferential surface of the rotor cup, a bottom of the vents is located above a bottom of the rotor cup, and a top of the vents is located above a top of the lower blades such that the air introduced into the inside of the rotor cup through the cooling holes formed at the bottom of the rotor cup collides with the stator and is discharged to outside of the rotor cup without passing through the stator.

2. The motor as set forth in claim 1, wherein the upper blades extend upwardly from the top of the rotor and protrude upwardly above the rotor cup.

3. The motor as set forth in claim 2, wherein the upper blades are formed such that each of the upper blades is at a prescribed angle to the radial direction of the rotor.

4. The motor as set forth in claim 3, wherein each of the upper blades has an acute sloping angle to the line extended in the rotating direction of the rotor and perpendicular to the radial direction of the rotor.

5. The motor as set forth in claim 1, wherein the cooling-holes are rectangular in shape.

6. The motor as set forth in claim 1, wherein a perimeter of each cooling-hole is located entirely within a flat bottom portion of the bottom part.

7. The motor as set forth in claim 1, wherein a shape of the lower blades is the same as a shape of the cooling-holes.

8. The motor as set forth in claim 1, wherein a size of the lower blades is the same as a size of the cooling-holes.

9. The motor as set forth in claim 1, wherein each lower blade is a portion of the bottom part that has been cut and bent upwardly.

10. A motor comprising:

a stator;

a rotor rotatably disposed around the stator; and a rotor cup having cooling-holes formed at the bottom part thereof for allowing external air to flow into the inside of the rotor cup therethrough, and lower blades formed at the bottom part thereof for generating a blowing force, the rotor being fixed to the rotor cup at the inner circumference thereof, wherein each of the lower blades protrudes from one side of each of the cooling-holes towards the stator, wherein each of the lower blades and the cooling-holes has an acute sloping angle to the line extended in the rotating direction of the rotor cup and perpendicular to the radial direction of the rotor cup, wherein a plurality of upper blades are located above the top of the rotor for discharging external air, which flows into the rotor cup through the cooling-holes formed at the bottom part of the rotor and then passes through the stator, to outside of the rotor cup, wherein a plurality of vents are located at a lower circumferential surface of the rotor cup, a bottom of the vents is located above a bottom of the rotor cup, and a top of the vents is located above a top of the lower blades such that the air introduced into the inside of the rotor cup through the cooling holes formed at the bottom of the rotor cup collides with the stator and is discharged to outside of the rotor cup without passing through the stator, and wherein the ratio of the whole areas of the cooling-holes to the whole areas of the vents is 2:1 to 4:1.

* * * * *